United States Patent Office 3,092,507
Patented June 4, 1963

3,092,507
METHOD OF PIGMENTATION WITHOUT GRINDING AND PAINTS RESULTING FROM THIS METHOD
Léon Pojurowski, Colayrac-Saint-Cirq, Lot-et-Garonne, France
No Drawing. Filed Oct. 22, 1959, Ser. No. 847,914
Claims priority, application France Oct. 22, 1958
1 Claim. (Cl. 106—293)

The present invention relates to a method of pigmentation for obtaining, without any grinding and by simple mixing, pigments of extreme fineness adapted for the manufacture of distemper or emulsion paints.

The invention further relates to paints comprising pigments obtained by the aforesaid method and, more particularly, paints which can be used as under-coats.

According to known methods, natural or synthetic fillers or pigment materials are provided in dry powdered form and subjected to a grinding operation until they are converted into a powder of extreme fineness.

A common drawback inherent to all such methods is that when the pigment or filler materials thus treated are to be wetted with water or a binder they clot, which clots can only be dispersed by using mechanical apparatus capable of subjecting the material to high pressures and to a mechanical rolling which is a costly operation even when using high-powered dispersing apparatus.

The present invention overcomes all these drawbacks as it eliminates any grinding step and only requires the use of a mixer.

More specifically, the object of the present invention is to provide a method of preparing pigments and fillers used for the production of paints of the distemper or emulsion type, said method being essentially characterised on the one hand in that an insoluble pigment or filler precipitate is obtained, consisting of a gel of a fairly high stiffness, by double or polydecomposition of two or more salts soluble in an aqueous medium and, on the other hand, in that the thus obtained gel, which, even if a high proportion of water were added thereto, would have been too stiff to be used for the preparation of a paint, is fluidised by the addition of a surface-active product, such as sodium hexametaphosphate.

Amongst the gels which are suitable for applying the method of the invention consisting of a paste capable of absorbing large quantities of water while keeping their stiffness and of being dispersed while preserving their fine texture are: lithopone, zinc sulfide, barium sulfate, lime carbonate, barium carbonate, lead and zinc chromates, as well as the lacquers from the fixation of an organic colour onto one of the aforesaid products.

It will be understood that for the preparation of distemper or emulsion paints the only suitable materials are those which are stable, insoluble and inert to the other ingredients of the paint formula. They must further have a pH close to neutral, e.g. from 5 to 8.

Moreover, it is advantageous to use a mixture of thus-formed gels, which may further be reinforced by mixing with noble pigments, ground separately and of a very high fineness, such as titanium ground in water.

The fluidising of these gels is necessary, since they remain stiff even after the addition of a very large quantity of water and they could not be used as such for the preparation of paints. Thus, for example, a barium sulfate having a 70% content of dry product, in the state in which it is commercially available, has a jelly-like consistency. Upon having water added thereto, the paste absorbs it and swells, but its stiffness only decreases slowly; at a 25% dry content, the viscosity is still much too high for a paint, while the concentration is much too low. The paste must therefore be necessarily fluidised; this can be achieved, for example, by using a solution of sodium hexametaphosphate at a concentration of 1.5 lb. of this salt per 100 lbs. of barium sulfate based on the dry weight in the paste. Obviously, other surface-active products can lead to the same results.

Once the paste has thus been fluidised, the manufacturer of distemper or emulsion paints can mix the compositions as customary for all the other ingredients included in the paint composition.

The present method is chiefly characterised in that it is carried out very simply. A simple mixer is sufficient, since no grinding is required, and the resulting product is a very fine, glossy and easily spread film.

The method of the invention enables paints having a high stability to be produced, showing no sedimentation even after a long period of storage and having a good viscosity for use, as this process allows dilution to a higher degree without risk of sedimentation. Other features and advantages of the present invention will become clear on reading the following description, giving merely by way of examples and without any intent of limitation, several types of paints prepared by the method of the invention.

EXAMPLES OF NORMAL VINYL PAINT

*Example No. 1*

| | Gr. |
|---|---|
| Lithopone paste, with a 70% dry extract (comprising a gel in accordance with the invention) | 600 |
| Hexametaphosphate | 6.7 |
| and | |
| Water | 49.3 |
| are mixed together for 15 to 20 minutes; then: | |
| Emulsion | 250 |
| Pine oil | 8 |
| "Ammonium polyacrylate" | 12 |
| are added, and the mixture is diluted with | |
| Water | 74 |
| Total weight of paint | 1,000 |

*Example No. 2*

| | |
|---|---|
| Lithopone paste, with a 70% dry extract | 300 |
| Barium sulfate, with a 70% dry extract | 300 |
| (both these products being gels in accordance with the invention) | |
| Hexametaphosphate | 6.7 |
| and | |
| Water | 49.3 |
| are mixed together for 15 to 20 minutes; then: | |
| Emulsion | 250 |
| Pine oil | 8 |
| "Ammonium polyacrylate" | 10 |
| are added, and the mixture is diluted with | |
| Water | 76 |
| Total weight of paint | 1,000 |

A particularly advantageous application of the method of pigmentation of the invention concerns the manufacturing of paints used as insulating under-coats, able to be used for sizing, enabling the finish to be effected with a single layer of ornamental oil, glycerophthalic, or any other paint, without loss of gloss or loss by absorption on the most porous or difficult of supports.

The importance of preparing suitable under-coats to paint on porous and difficult supports is well known in the art, as well as their effect on the cost price of the finished work.

The usual method of preparing under-coats consists of covering the support with lean products and then applying at least two under-coats and two finishing coats.

The present invention simplifies these operations by using an insulating plastic film which cannot penetrate into the support, but has a great adherence and very good spreading characteristics. This film forms a genuine screen and also an adhesive layer for the finishing paints and lacquers. It forms a semi-pervious wall which prevents dispersions in a colloidal medium from passing therethrough, but remains pervious to gases and vapours.

The two following examples provide advantageous compositions for use as under-coats:

*Example I*

PASTE (I)

| | Kg. |
|---|---|
| Barium sulfate paste, at 70% dry content | 40 |
| Titanium oxide (rutile) paste, ground to 50% in water | 10 |
| Sodium hexametaphosphate predissolved in 5 liters hot water | 0.530 |

LIQUID (II)

| | |
|---|---|
| Polyvinyl acetate emulsion at 50% dry extract | 33 |
| Pine oil | 0.800 |
| Ammonium methacrylate | 0.500 |
| Water | 15.170 |

For 100 kg. of paint

*Example II*

PASTE (I)

| | Kg. |
|---|---|
| Molecular lithopone paste, at 70% dry content | 40 |
| Titanium oxide (rutile) paste, ground to 50% in water | 10 |
| Sodium hexametaphosphate dissolved in 5 liters hot water | 0.530 |

LIQUID (II)

| | |
|---|---|
| Styrene-butadiene copolymer emulsion 85/15 to 50% dry | 30 |
| Pine oil | 1 |
| Sodium polyacrylate | 1.500 |
| Water | 16.970 |

For 100 kg. of paint

For the above two examples, the components forming Paste (I) are intimately mixed for 10 to 20 minutes, and then poured into the Liquid (II), or vice versa, stirring slowly for 10 to 20 minutes.

The product as given by Example II has better covering power.

Although these under-coats are of a widespread use and can be applied to most types of supports, as any other kinds of coatings, they are more especially suitable for the following cases:

(1) Whenever it is desired to decorate with conventional paints, supports which cannot be directly painted without a lengthy and costly under-preparation; porous backgrounds of all kinds, difficult backgrounds, such as wood, fabric, paper, ply-wood, cardboard, dry or wet plaster, earthenware, modern agglomerates, fibro-cements, dry and fresh concretes, etc.

(2) In cases when due to humidity, conventional paints do not take, or when colour spots, old smoke, tars, etc., are to be isolated.

(3) To enable an accidentally damp wall to be painted.

(4) To protect a support against oil sprays, as the under-coat paints of the invention can be cleaned with spirit cleaners and preclude the penetration of oily materials.

(5) To coat porous containers adapted for the storage of oily substances.

(6) For the preparation of wall-papers and the like painted with oil or glycophthalic or the like.

(7) For the preparation of bituminous support under-coats.

The pigments prepared by the method of the invention can also be used in the manufacture of printing pastes and inks, in particular for printing pastes and inks adapted to be applied to very porous paper or to cloth.

The emulsion used for these products must be necessarily an oil-in-water type of emulsion of plastic resins setting rapidly at room temperatures, insoluble in oils and in aliphatic solvents, of very low solubility in aromatics and having high evaporation points. These resins must be of a highly adhesive type and preferably of the thermoplastic variety. Obviously, they must not react with the other ingredients, have a pH of from 5 to 8.5, have a good resistance to water and chemical agents and be well stabilized and duly plastified. They must be readily emulsifiable and form fine emulsions stable at low temperatures. These emulsions can be emulsions of: polymers of vinylic, acrylic or methacrylic esters, polystyrene or copolymers such as styrene-butadiene 85/15, etc., natural latex can even be used in certain cases.

Generally, the emulsions used have a 40 to 60% dry content.

The formation of the insulating, non-penetrating film is due to the property of emulsions to coagulate when the concentration of the dispersion phase decreases, which is the case when an emulsion is spread over a porous body.

The thickener used exclusively comprises a solution of an ammonium salt of polyacrylic or polymethacrylic acids. The slow decomposition thereof on the film endows it with a higher resistance to water. The purpose of its use is not only to provide a protective colloid, but to control the speed of drying and enable it to be readily spread by brush or by roller.

The pigments and fillers calculated on a dry base cannot be lower than 20% based on the total weight of the paint, nor, even more important, higher than 40% thereof, since their chief function is to act as modifiers of the plastic film left after the drying of the emulsions.

*Emulsion.*—The calculation is made on the weight of dry resins contained in the emulsion. The proportion is:

Dry fillers and pigments: 100.
Dry resin contained in the emulsion: 50 to 65.
Total water: 35 to 40% of the total weight of the finished product.

With respect to their colouring, the paints or under-coats of the present invention can be coloured by adding lacquer, as aforesaid, but also by addition of mineral or organic pigments, coloured and finely preground (as for the white thickening pigments).

The coloration can also be achieved by means of organic colourings soluble in water or in a solvent readily dispersible in the emulsion.

It is to be understood that the present invention has just been described merely by way of explanation without any intention of limitation, and that numerous changes can be made therein without falling outside its scope.

I claim:

A method for directly obtaining mineral pigments in a finely divided state and ready for use in the manufacture of emulsion paints, printing pastes and inks without grinding said method consisting in mixing aqueous solutions of soluble salts to obtain in situ an insoluble stiff gel of the proper particle size as a result of the double decomposition of said soluble salts, said stiff gel being selected from the group consisting of lithopone, zinc sulfide, barium sulfate, lime carbonate, barium carbonate, lead chromate and zinc chromate, and thereafter adding about 1% by weight of sodium hexametaphosphate which is surface-active and fluidises said gel.

References Cited in the file of this patent

UNITED STATES PATENTS

| | | |
|---|---|---|
| 1,261,135 | Kohlins | Apr. 2, 1918 |
| 2,117,366 | Saunders | May 17, 1938 |
| 2,212,629 | Allesandroni | Aug. 27, 1940 |
| 2,260,871 | Sawyer | Oct. 28, 1941 |
| 2,313,844 | Sullivan | Mar. 16, 1943 |
| 2,337,598 | Hall | Dec. 28, 1943 |
| 2,880,099 | Audrieth | Mar. 31, 1959 |

FOREIGN PATENTS

| | | |
|---|---|---|
| 505,709 | Great Britain | May 16, 1939 |

OTHER REFERENCES

National Paint Dictionary, pub. 1948 (3d ed.), by Stewart Research Laboratory, Washington, D.C., page 511.